Sept. 28, 1948.  H. F. CRAVEN  2,450,185
HAND OPERATED ROTARY IMPACT SCREWDRIVER
Filed Oct. 31, 1944  2 Sheets-Sheet 1
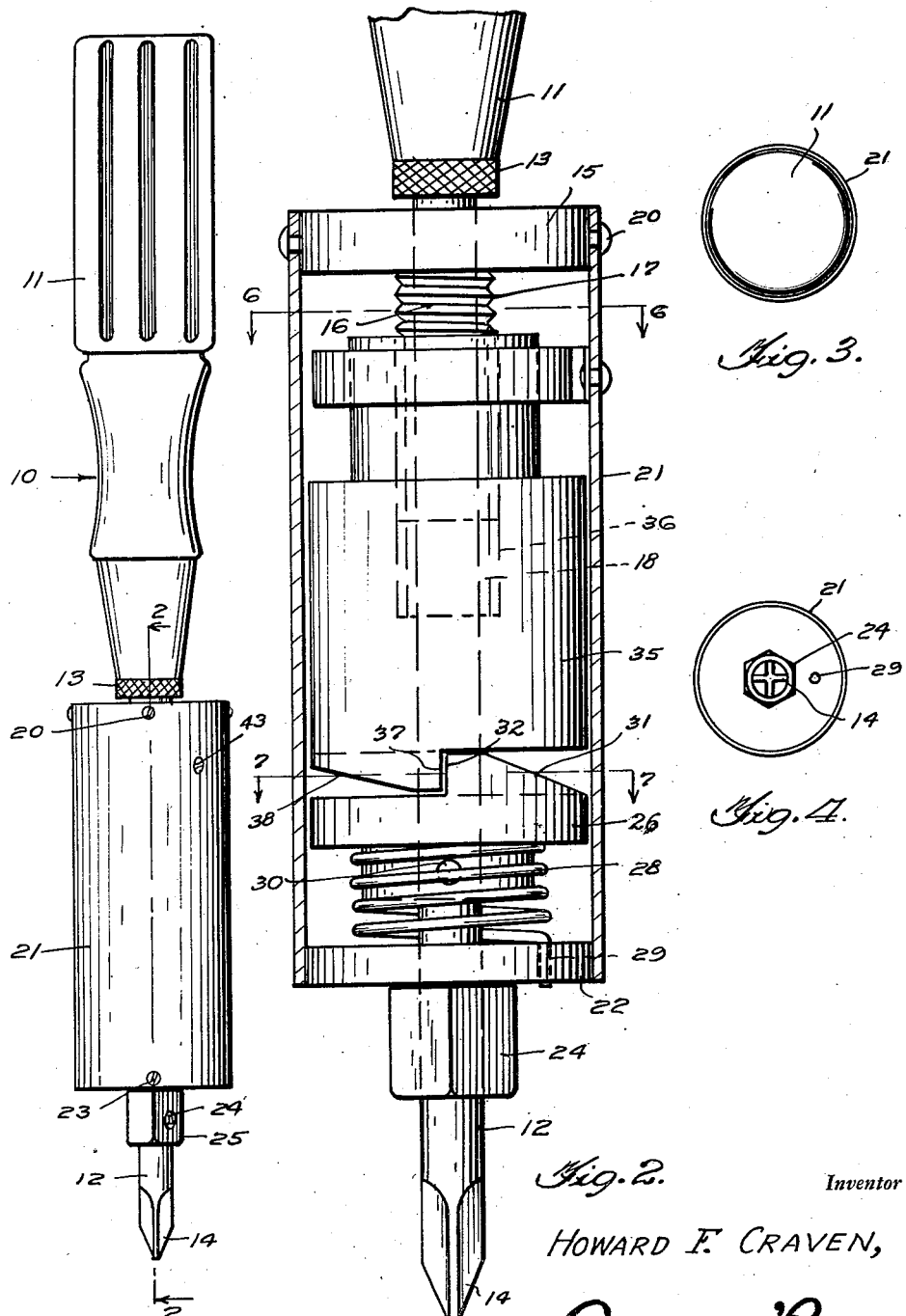
Inventor
HOWARD F. CRAVEN,
By Clarence A. O'Brien
and Harvey B. Jacobson
Attorneys Sept. 28, 1948.  H. F. CRAVEN  2,450,185
HAND OPERATED ROTARY IMPACT SCREWDRIVER
Filed Oct. 31, 1944  2 Sheets-Sheet 2

Inventor
HOWARD F. CRAVEN,
By *Clarence A. O'Brien and Harvey B. Jacobson*
Attorneys Patented Sept. 28, 1948

2,450,185

UNITED STATES PATENT OFFICE 2,450,185

HAND OPERATED ROTARY IMPACT SCREW DRIVER

Howard F. Craven, Redondo Beach, Calif.

Application October 31, 1944, Serial No. 561,273

2 Claims. (Cl. 145—50)

This invention relates to a device for loosening tight screws, and more particularly to such a device adapted to be utilized in conjunction with a screwdriver.

A primary object of this invention is the provision of an improved means, in association with a screwdriver, whereby when it is required to loosen a tight screw the initial release of the same may be readily effected.

An additional object is the provision of such a device which may be readily associated with a screwdriver of conventional design.

Still another object is the provision of such a device which will be sturdy and durable in construction, effective and reliable in operation, and relatively simple and inexpensive to manufacture and assemble.

Other objects will in part be obvious and in part be pointed out hereinafter and shown in the accompanying drawings wherein there is disclosed the preferred embodiment of this inventive concept.

In the drawings:

Figure 1 is a side elevational view of one form of device embodying the instant invention.

Figure 2 is an enlarged sectional view taken along the line 2—2 of Figure 1, as viewed in the direction indicated by the arrows, the position of certain parts thereof being indicated by dotted lines.

Figure 3 is a top plan view of the device in Figure 1.

Figure 4 is a bottom plan view of the device shown in Figure 1.

Like reference numerals refer to like parts throughout the several views of the drawings.

Figure 5:
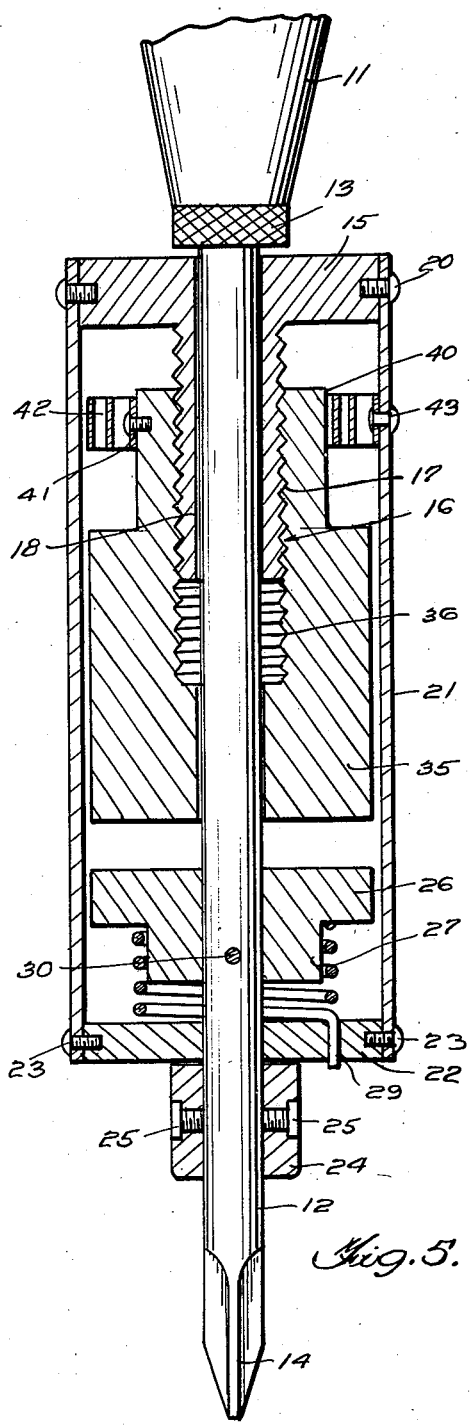
Figure 5 is an enlarged sectional view taken along the line 5—5 of Figure 7, as viewed in the direction indicated by the arrows.

Having reference now to the drawings, there is generally indicated at 10 a screwdriver, including a handle 11 secured to a shank 12, as by means of a collet 13, the shank 12 being provided with a point or blade 14 of any desired type.

Rotatably positioned about shank 12 is a collar 15 provided with a downwardly extending portion 16 threaded externally as at 17 and provided with a centrally positioned bore 18 within which shank 12 is adapted to be rotated. Secured to the periphery of collar 15 as by screws or the like 20 is a sleeve 21 the lower portion of which terminates in a second collar 22 secured thereto as by screws 23, the sleeve and collar assembly being held in position on the shank 12 as by means of a block 24 removably secured to the shank as by means of set screws 25.

Positioned within sleeve 21 is a plate 26 having a depending circular portion 27 about which is positioned a coiled compression spring 28 the lower end of which is down-turned as at 29 and extends through a suitable aperture in collar 22 securing the same therein and serving as a shock absorber for the impact when said device is operated. Plate 26 is secured to shank 12 as by means of a pin 30 in suitable aligned apertures therein. The upper end of the spring 28 abuts the lower surface of the plate 26, and the upper surface of the plate 26 is provided, as best shown in Figure 2, with an inclined cam surface 31 terminating in an abutment 32.

Also positioned in sleeve 21 above plate 26 is a relatively heavy cylindrical block 35 provided with an internally threaded bore 36 adapted to coact with the threads 17 of portion 16 of collar 15. The lower surface of block 35 is also provided with an abutment surface 37 adapted normally to rest in abutting relationship with surface 32, and a corresponding cam or incline surface 38 is likewise provided.

Figure 6:
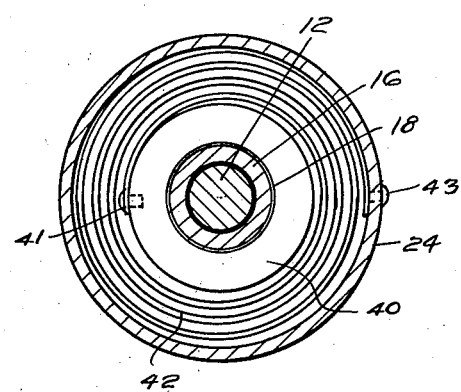
Figure 6 is a sectional view taken substantially along the line 6—6 of Figure 2, as viewed in the direction indicated by the arrows.
Figure 7:
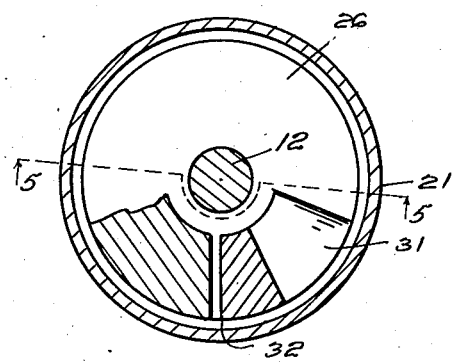
Figure 7 is a sectional view taken substantially along the line 7—7 of Figure 2, as viewed in the direction indicated by the arrows.

The upper portion of block 35 is reduced as at 40 and has secured thereto as by a screw 41 one end of a flat coil spring 42 the other end of which is secured, as best shown in Figures 5 and 6 to sleeve 21 as by a screw 43.

From the foregoing the operation of the device should now be readily understandable. When it is desired to loosen a particularly tight screw the blade 14 is first inserted in the head of the screw. Sleeve 21 is then grasped with one hand the other hand holding the handle 11, and rotated in a direction to cause the coaction of threads 36 and 17 to lift the abutment 37 vertically out of engagement with abutment 32. Upon the completion of this disengagement the spring 42 whips the block 35 in a complete circle, the screw threads 36 and 16 simultaneously lowering the abutment 37 to its previous level whereupon abutment 37 sharply strikes abutment 32 and the impact is transmitted in the form of a jar to shank 12 and hence blade 14 and the associated screw. Obviously, this action may be repeated as many times as is necessary to loosen the screw and, once loosened, the same may be removed by utilizing the device in the manner of an ordinary screwdriver. Equally obviously the device also has utility as a conventional screwdriver.

Now from the foregoing it will be seen that there is herein provided a device accomplishing all the objects of this invention and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a device of the character described including a screw driver formed with a shank having a handle secured on one end and a blade on its opposite end, a collar having a reduced exteriorly threaded depending portion slidably and rotatably disposed on said shank, an operating sleeve disposed about said collar, means for connecting said sleeve and collar together, a second collar slidably and rotatably disposed about said shank and secured to the lower end of said sleeve, a relatively heavy cylindrical block disposed within said sleeve and slidably and rotatably about said shank, said block being formed with an axial bore threaded at its upper end said threaded portion being engageable with said reduced externally threaded depending portion, the upper end of said block being reduced, a convolute spring disposed about said reduced upper end of the block having one end secured thereto and its opposite end secured to said sleeve, the lower end of said block being formed with a cam surface terminating in a shoulder, a plate disposed about and secured to said shank below said block and within said sleeve and having a reduced depending portion on its lower end and a cam surface terminating in a shoulder on its upper end said last mentioned shoulder cooperating with said first mentioned shoulder and normally abutting the latter, and a coil spring disposed about said reduced depending portion of said plate abutting the lower surface of the plate at its upper end and secured to said second collar at its lower end.

2. In a device of the character described including a screw driver formed with a shank having a handle secured on one end and a blade on its opposite end, a collar having a reduced externally threaded depending portion slidably and rotatably disposed on said shank, an operating sleeve disposed about said collar, means for connecting said sleeve and collar together, a second collar slidably and rotatably disposed about said shank and secured to the lower end of said sleeve, a relatively heavy cylindrical block disposed within said sleeve and slidably and rotatably about said shank, said block being formed with an axial bore threaded in its upper end said threaded portion being engageable with said reduced externally threaded depending portion, the upper end of said block being reduced, a convolute spring disposed about said reduced upper end of the block having one end secured thereto and its opposite end secured to said sleeve, the lower end of said block being formed with a cam surface terminating in a shoulder, a plate disposed about and secured to said shank below said block and within said sleeve and having a reduced depending portion on its lower end and a cam surface terminating in a shoulder on its upper end said last mentioned shoulder cooperating with said first mentioned shoulder and normally abutting the latter, a coil spring disposed about said reduced depending portion of said plate abutting the lower surface of the plate at its upper end and secured to said second collar at its lower end, and a position limiting block removably secured to the said shank by said block being positioned below said second collar and spaced from said plate.

HOWARD F. CRAVEN.

REFERENCES CITED

The following references are of record in the file of this patent:

UNITED STATES PATENTS

| Number | Name | Date |
|---|---|---|
| 1,831,187 | Mohr | Nov. 10, 1931 |
| 2,012,916 | Pott | Aug. 27, 1935 |
| 2,300,392 | Austin | Nov. 3, 1942 |
| 2,308,428 | Ronning et al. | Jan. 12, 1943 |